(12) United States Patent
Dickson et al.

(10) Patent No.: US 7,124,211 B2
(45) Date of Patent: Oct. 17, 2006

(54) SYSTEM AND METHOD FOR EXPLICIT COMMUNICATION OF MESSAGES BETWEEN PROCESSES RUNNING ON DIFFERENT NODES IN A CLUSTERED MULTIPROCESSOR SYSTEM

(75) Inventors: Christopher Dickson, Edina, MN (US); David Caliga, Colorado Springs, CO (US); James O'Connor, Colorado Springs, CO (US); Daniel Poznanovic, Colorado Springs, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 75 days.

(21) Appl. No.: 10/278,345

(22) Filed: Oct. 23, 2002

(65) Prior Publication Data

US 2004/0083317 A1    Apr. 29, 2004

(51) Int. Cl.
*G06F 13/28* (2006.01)

(52) U.S. Cl. .................. 710/22; 709/212; 709/213; 709/215; 711/147

(58) Field of Classification Search ............ 710/22; 709/212–213, 215, 238; 711/147
See application file for complete search history.

(56) References Cited

U.S. PATENT DOCUMENTS

| | | | |
|---|---|---|---|
| 5,230,057 A | | 7/1993 | Shido et al. |
| 5,446,841 A | * | 8/1995 | Kitano et al. ............... 709/213 |
| 5,584,010 A | * | 12/1996 | Kawai et al. ............... 711/117 |
| 5,754,781 A | * | 5/1998 | Kitta ........................... 709/213 |
| 5,802,589 A | * | 9/1998 | Brady et al. ................ 711/157 |
| 5,841,963 A | * | 11/1998 | Nakamikawa et al. ........ 714/11 |
| 5,892,962 A | | 4/1999 | Cloutier |
| 5,903,771 A | | 5/1999 | Sgro et al. |
| 6,052,773 A | | 4/2000 | DeHon et al. |
| 6,076,152 A | | 6/2000 | Huppenthal et al. |
| 6,108,693 A | * | 8/2000 | Tamura ....................... 709/213 |
| 6,192,439 B1 | | 2/2001 | Grunewald et al. |
| 6,212,610 B1 | * | 4/2001 | Weber et al. ................ 711/164 |
| 6,647,453 B1 | * | 11/2003 | Duncan et al. ............. 710/306 |

OTHER PUBLICATIONS

William Ford and William Topp, "Data Structures with C++", 1996 by Prentice-Hall, Inc., p. 49.*
Agarwal, A., et al., "The Raw Compiler Project", pp. 1-12, http://cag-www.lcs.mit.edu/raw, Proceedings of the Second SUIF Compiler Workshop, Aug. 21-23, 1997.

(Continued)

*Primary Examiner*—Fritz Fleming
*Assistant Examiner*—Niketa Patel
(74) *Attorney, Agent, or Firm*—William J. Kubida; Michael C. Martensen; Hogan & Hartson LLP

(57) ABSTRACT

Embodiments of the invention include a mechanism for explicit communication in a clustered multiprocessor system that supports low-latency, protected, user-mode, communication across the machine boundaries of a clustered multiprocessor. Data transport may be accomplished over persistent, unidirectional, point-to point connections, each of which may be embodied in a small amount of state at each end, along with a statically allocated per-connection memory buffer, which may be directly accessible to the transport mechanism at both ends of each notional link. System Memory protection may be afforded by operating system ("OS") facilitated allocation of both restricted control of the network interface, and responsibility for data transport, to an application thread that may execute in the context of the processor-managed virtual address space. Connection buffer protection may be afforded by restricting access to connection state to those entries associated with the currently controlling thread.

18 Claims, 5 Drawing Sheets

OTHER PUBLICATIONS

Albaharna, Osama, et al., "On The viability of FPGA-based integrated coprocessors", © 1996 IEEE, Publ. No. 0-8186-7548-9/96, pp. 206-215.

Amerson, Rick, et al., "Teramac—Configurable Custom Computing", © 1995 IEEE, Publ. No. 0-8186-7086-X/95, pp. 32-38.

Barthel, Dominique Aug. 25-26, 1997, "PVP a Parallel Video coProcessor", Hot Chips IX, pp. 203-210.

Bertin, Patrice, et al., "Programmable active memories: a performance assessment", © 1993 Massachusetts Institute of Technology, pp. 88-102.

Bittner, Ray, et al., "Computing kernels implemented with a wormhole RTR CCM", © 1997 IEEE, Publ. No. 0-8186-8159-4/97, pp. 98-105.

Buell, D., et al. "Splash 2: FPGAs in a Custom Computing Machine—Chapter 1—Custom Computing Machines: An Introduction", pp. 1-11, http://www.computer.org/espress/catalog/bp07413/spls-ch1.html (originally believed published in J. of Supercomputing, vol. IX, 1995, pp. 219-230.

Casselman, Steven, "Virtual Computing and The Virtual Computer", © 1993 IEEE, Publ. No. 0-8186-3890-7/93, pp. 43-48.

Chan, Pak, et al., "Architectural tradeoffs in field-programmable-device-based computing systems", © 1993 IEEE, Publ. No. 0-8186-3890-7/93, pp. 152-161.

Clark, David, et al., "Supporting FPGA microprocessors through retargetable software tools", © 1996 IEEE, Publ. No. 0-8186-7548-9/96, pp. 195-103.

Cuccaro, Steven, et al., "The CM-2X: a hybrid CM-2/Xilink prototype", © 1993 IEEE, Publ. No. 0-8186-3890-7/93, pp. 121-130.

Culbertson, W. Bruce, et al., "Exploring architectures for volume visualization on the Teramac custom computer", © 1996 IEEE, Publ. No. 0-8186-7548-9/96, pp. 80-88.

Culbertson, W. Bruce, et al., "Defect tolerance on the Teramac custom computer", © 1997 IEEE, Publ. No. 0-8186-8159-4/97, pp. 116-123.

Dehon, Andre, "DPGA-Coupled microprocessors: commodity IC for the early 21$^{st}$ century", © 1994 IEEE, Publ. No. 0-8186-5490-2/94, pp. 31-39.

Dehon, A., et al., "MATRIX A Reconfigurable Computing Device with Configurable Instruction Distribution", Hot Chips IX, Aug. 25-26, 1997, Stanford, California, MIT Artificial Intelligence Laboratory.

Dhaussy, Philippe, et al., "Global control synthesis for an MIMD/FPGA machine", © 1994 IEEE, Publ. No. 0-8186-5490-2/94, pp. 72-81.

Elliott, Duncan, et al., "Computational Ram: a memory-SIMD hybrid and its application to DSP", © 1992 IEEE, Publ. No. 0-7803-0246-X/92, pp. 30.6.1-30.6.4.

Fortes, Jose, et al., "Systolic arrays, a survey of seven projects", © 1987 IEEE, Publ. No. 0018-9162/87/0700-0091, pp. 91-103.

Gokhale, M., et al., "Processing in Memory: The Terasys Massively Parallel PIM Array" © Apr. 1995, IEEE, pp. 23-31.

Gunther, Bernard, et al., "Assessing Document Relevance with Run-Time Reconfigurable Machines", © 1996 IEEE, Publ. No. 0-8186-7548-9/96, pp. 10-17.

Hagiwara, Hiroshi, et al., "A dynamically microprogrammable computer with low-level parallelism", © 1980 IEEE, Publ. No. 0018-9340/80/07000-0577, pp. 577-594.

Hartenstein, R. W., et al. "A General Approach in System Design Integrating Reconfigurable Accelerators," http://xputers.informatik.uni-kl.de/papers/paper026-1.html, IEEE 1996 Conference, Austin, TX, Oct. 9-11, 1996.

Hartenstein, Reiner, et al., "A reconfigurable data-driven ALU for Xputers", © 1994 IEEE, Publ. No. 0-8186-5490-2/94, pp. 139-146.

Hauser, John, et al.: "GARP: a MIPS processor with a reconfigurable co-processor", © 1997 IEEE, Publ. No. 0-08186-8159-4/97, pp. 12-21.

Hayes, John, et al., "A microprocessor-based hypercube, supercomputer", © 1986 IEEE, Publ. No. 0272-1732/86/1000-0006, pp. 6-17.

Herpel, H. -J., et al., "A Reconfigurable Computer for Embedded Control Applications", © 1993 IEEE, Publ. No. 0-8186-3890-7/93, pp. 111-120.

Hogl, H., et al., "Enable++: A second generation FPGA processor", © 1995 IEEE, Publ. No. 0-8186-7086-X/95, pp. 45-53.

King, William, et al., "Using MORRPH in an industrial machine vision system". © 1996 IEEE, Publ. No. 08186-7548-9/96, pp. 18-26.

Manohar, Swaminathan, et al., "A pragmatic approach to systolic design", © 1988 IEEE, Publ. No. CH2603-9/88/0000/0463, pp. 463-472.

Mauduit, Nicolas, et al., "Lneuro 1.0: a piece of hardware LEGO for building neural network systems," © 1992 IEEE, Publ. No. 1045-9227/92, pp. 414-422.

Mirsky, Ethan A., "Coarse-Grain Reconfigurable Computing", Massachusetts Institute of Technology, Jun. 1996.

Mirsky, Ethan, et al., "MATRIX: A Reconfigurable Computing Architecture with Configurable Instruction Distribution and Deployable Resources", © 1996 IEEE, Publ. No. 0-8186-7548-9/96, pp. 157-166.

Morley, Robert E., Jr., et al., "A Massively Parallel Systolic Array Processor System", © 1988 IEEE, Publ. No. CH2603-9/88/0000/0217, pp. 217-225.

Patterson, David, et al., "A case for intelligent DRAM: IRAM", Hot Chips VIII, Aug. 19-20, 1996, pp. 75-94.

Peterson, Janes, et al., "Scheduling and partitioning ANSI-C programs onto multi-FPGA CCM architectures", © 1996 IEEE, Publ. No. 0-8186-7548-9/96, pp. 178-187.

Schmit, Herman, "Incremental reconfiguration for pipelined applications," © 1997 IEEE, Publ. No. 0-8186-8159-4/97, pp. 47-55.

Sitkoff, Nathan, et al., "Implementing a Genetic Algorithm on a Parallel Custom Computing Machine", Publ. No. 0-8186-7086-X/95, pp. 180-187.

Stone, Harold, "A logic-in-memory computer", © 1970 IEEE, IEEE Transactions on Computers, pp. 73-78, Jan. 1990.

Tangen, Uwe, et al., "A parallel hardware evolvable computer POLYP extended abstract", © 1997 IEEE, Publ. No. 0-8186-8159/4/97, pp. 238-239.

Thornburg, Mike, et al., "Transformable Computers", © 1994 IEEE, Publ. No. 0-8186-5602-6/94, pp. 674-679.

Tomita, Shinji, et al., "A computer low-level parallelism QA-2", © 1986 IEEE, Publ. No. 0-0384-7495/86/0000/0280, pp. 280-289.

Trimberger, Steve, et al., "A time-multiplexed FPGA", © 1997 IEEE, Publ. No. 0-8186-8159-4/97, pp. 22-28.

Ueda, Hirotada, et al., "A multiprocessor system utilizing enhanced DSP's for image processing", © 1988 IEEE, Publ. No. CH2603-9/88/0000/0611, pp. 611-620.

Villasenor, John, et al., "Configurable computing", © 1997 Scientific American, Jun. 1997.

Wang, Quiang, et al., "Automated field-programmable compute accelerator design using partial evaluation", © 1997 IEEE, Publ. No. 0-8186-8159-4/97, pp. 145-154.

W.H. Mangione-Smith and B.L. Hutchings. Configurable computing: The Road Ahead. In Proceedings of the Reconfigurable Architectures Workshop (RAW'97), pp. 81-96,1997.

Wirthlin, Michael, et al., "The Nano processor: a low resource reconfigurable processor", © 1994 IEEE, Publ. No. 0-8186-5490-2/94, pp. 23-30.

Wirthlin, Michael, et al., "A dynamic instruction set computer", © 1995 IEEE, Publ. No. 0-8186-7086-X/95, pp. 99-107.

Wittig, Ralph, et al., "One Chip: An FPGA processor with reconfigurable logic", © 1996 IEEE, Publ. No. 0-8186-7548-9/96, pp. 126-135.

Yamauchi, Tsukasa, et al., "SOP: A reconfigurable massively parallel system and its control-data flow based compiling method", © 1996 IEEE, Publ. No. 0-8186-7548-9/96, pp. 148-156.

"Information Brief", PCI Bus Technology, © IBM Personal Computer Company, 1997, pp. 1-3.

Yun, Hyun-Kyu and Silverman, H. F.; "A distributed memory MIMD multi-computer with reconfigurable custom computing capabilities", Brown University, Dec. 10-13, 1997, pp. 7-13.

\* cited by examiner

SYSTEM AND METHOD FOR EXPLICIT COMMUNICATION OF MESSAGES BETWEEN PROCESSES RUNNING ON DIFFERENT NODES IN A CLUSTERED MULTIPROCESSOR SYSTEM

CROSS REFERENCE TO RELATED PATENT APPLICATIONS

The present invention is related to the subject matter disclosed in U.S. patent application Ser. No. 09/932,330 filed Aug. 17, 2001 for: "Switch/Network Adapter Port for Clustered Computers Employing a Chain of Multi-Adaptive Processors in a Dual In-Line Memory Module Format" assigned to SRC Computers, Inc., Colorado Springs, Colo., assignee of the present invention, the disclosure of which is herein specifically incorporated in its entirety by this reference.

COPYRIGHT NOTICE/PERMISSION

A portion of the disclosure of this patent document contains material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data and described below, inclusive of the drawing figures where applicable: Copyright© 2002, SRC Computers, Inc.

BACKGROUND OF THE INVENTION

1. Field of the Invention

The present invention relates, in general, to the field of computers and computing systems. More particularly, the present invention relates to a system and method for implementing a streamlined, low-level, user-mode, data transport mechanism for communicating messages between processes running on different nodes of a computer system cluster. In a representative embodiment disclosed herein, the processes may be implemented in conjunction with a switch/network adapter port ("SNAP™", a trademark of SRC Computers, Inc.) and is denominated a SNAP explicit communication facility ("SNAPCF™", also a trademark of SRC Computers, Inc.)

2. Relevant Background

In some instances, it is desirable to construct clustered computing systems out of nodes, with each node comprising some number of processors with a locally shared memory address space, such that it is possible for an application spanning a large number of nodes to participate in global communication. For performance reasons, it is important that this communication be performed with no per-transfer operating system involvement, that the end-to-end message latency be minimized and that the mechanism makes efficient use of available link bandwidth. For overall usability, it is necessary that the mechanism provide a means by which the source (or "send") side of each communication can correctly address the target memory at the destination (i.e "naming") in a manner which allows the operating system to maintain protected memory access.

Typically, communication in a clustered system takes place through a network interface or input/output ("I/O") device. This has traditionally required operating system intervention in order to send messages. More recently, some network interface cards are being designed to support user-level communication using operating system ("OS") bypass interfaces such as Myrinet GM (a high-performance, packet-communication and switching technology that is widely used to interconnect clusters of workstations, PCs, servers, or single-board computers), Virtual Interface Architecture ("VIA"), and Scheduled Transport ("ST"). Without exception, these OS-bypass capable interfaces have been designed to allow packet-based communication between source and destination network interface cards ("NICs") with no intermediate storage. As such, buffer storage on both the "send" and "receive" sides is limited and must be dynamically managed to allow for the fact that data associated with any connection might be received at any time.

It has also been generally assumed that a requirement for asynchronous communication support exists (i.e. that the system processors should not need to be actively involved in the transport of message data). As a result, existing OS-bypass implementations all employ complex, time-consuming schemes for managing address mapping/translation, as well as direct memory access ("DMA") transport.

SUMMARY OF THE INVENTION

In contrast, the system and method for explicit communication of messages between processes running on different nodes in a clustered multiprocessor system disclosed herein is optimized for an environment in which memory is relatively inexpensive, plentiful and directly accessible to both sides of a given connection. In accordance with the present invention, the employment of large, statically allocated, per-connection memory buffers allows the creation of a new type of communication protocol in which control information may be transmitted from point-to-point, with the data being stored in an intermediate location until the receive side SNAP is ready to accept it.

The system and method of the present invention is advantageously operative in a largely single application environment that may not use asynchronous (i.e. concurrent) communication. This can allow for a substantial simplification of the system hardware and software associated with providing virtual-to-physical address mapping (and active DMA transport) and may also allow for the allocation of a SNAP to one process or user at a time. Protection may be afforded by restricting the connections serviced to those associated with the currently controlling process or user and transport may be accomplished by the system processors operating in the controlling process' or user's virtual address ("VA") space.

The present invention also includes message transport that may be accomplished over one or more connections that may be persistent, unidirectional, and/or point-to point connections. The end points of these connections may be identified by means of "connection descriptors". Each connection descriptor may provide an index into a SNAP (c.f. a NIC) resident connection state table (the Outgoing and Incoming Local Connection Tables; "OLCT" and "ILCT" respectively).

The present invention further includes a relatively large, statically allocated, per-connection memory buffer may be coupled to the connections. The per-connection memory buffer may be directly writable by the sending SNAP, and directly readable by the receive side SNAP. This per-connection buffer can allow the send side and receive side of a connection to be substantially decoupled from each other. Thus, process data from a source processor node may be written from the send side to the per-connection buffer without having already established that the receive side can receive the data. Conversely, the receive side logic is free to choose the currently active connection, based on a combination of the identity of the process currently in control of the connection and/or SNAPs and the amount of data queued up in the per-connection buffer for each incoming connection. The latter information may be provided by means of control packets (Internet Policy Institute ("IPI") packets) that may be exchanged between the send and receive side SNAPs directly, and can be used to update the incoming connection state (i.e. an ILCT entry).

The present invention may also include the staging of data between source side system memory and the send side SNAP, and between the receive side SNAP and destination side system memory, with a user-mode, virtual address-based, processor loads/stores between a memory-mapped window on the SNAP, the processor, and the target memory. This may relieve the connection and its constituent SNAPs from having to perform data transport (DMA) and address translation. In addition, protection may be assured by making connection setup an OS-privileged operation, by restricting control of a connection or an individual SNAP to a single process at a time and also by restricting the connections accessible to the controlling process to those associated with the current thread.

These and other features and advantages of the invention, as well as the structure and operations of various embodiments of the invention, are described in detail below with reference to the accompanying figures.

DETAILED DESCRIPTION OF THE PREFERRED EMBODIMENTS

Figure 1:
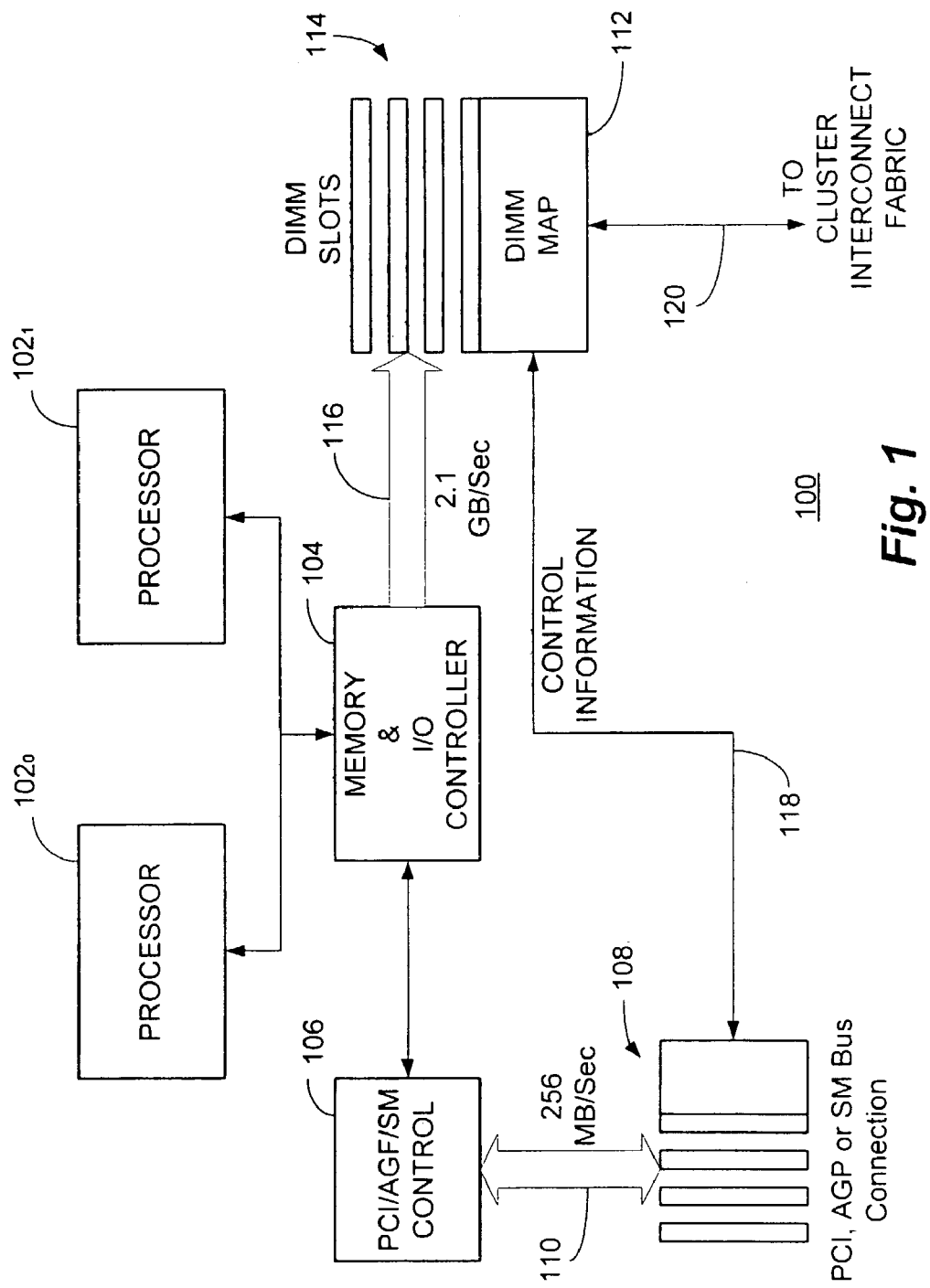
FIG. 1 is a functional block diagram of an exemplary embodiment of a switch/network adapter port ("SNAP") as disclosed in the aforementioned patent application for clustered computers employing a chain of multi-adaptive processors in a DIMM format to significantly enhance data transfer rates over that otherwise available from the peripheral component interconnect ("PCI") bus.

While the invention is susceptible to various modifications and alternative forms, specific embodiments thereof are shown by way of example in the drawings above, and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

With reference now to FIG. 1, a functional block diagram of an exemplary embodiment of a computer system 100 comprising a switch/network adapter port ("SNAP") for clustered computers employing a chain of multi-adaptive processors in a DIMM format, as disclosed in U.S. patent application Ser. No. 09/932,330, is shown and which may be used to significantly enhance data transfer rates over that otherwise available from the peripheral component interconnect ("PCI") bus.

In the particular embodiment illustrated, the computer system 100 includes one or more processors $102_0$ and $102_1$ which are coupled to an associated memory and I/O controller 104. In operation, the controller 104 sends and receives control information from a PCI control block 106. It should be noted that in alternative implementations of the present invention, control block 106 may also be Peripheral Component Interface Extended (PCI-X), InfiniBand, an accelerated graphics port ("AGP") or systems maintenance ("SM") control block, among others. The PCI control block 106 is coupled to one or more PCI card slots 108 by means of a relatively low bandwidth PCI bus 110 which allows data transfers at a rate of substantially 256 MB/sec. In the alternative embodiments of the present invention mentioned above, the card slots 108 may alternatively comprise AGP or SM bus connections.

The controller 104 is also conventionally coupled to a number of DIMM slots 114 by means of a much higher bandwidth DIMM bus 116 capable of data transfer rates of substantially 2.1 GB/sec. or greater. In accordance with a particular implementation of the present invention, a DIMM MAP element 112 is associated with, or physically located within, one of the DIMM slots 114. Control information to or from the DIMM MAP element 112 is provided by means of a connection 118 interconnecting the PCI bus 110 and the DIMM MAP element 112. The DIMM MAP element 112 then may be coupled to another clustered computer MAP element by means of a cluster interconnect fabric connection 120 connected to the MAP chain ports. The DIMM MAP element 112 may also comprise a Rambus DIMM (RIMM) MAP element.

Since the DIMM memory located within the DIMM slots 114 comprises the primary memory storage location for the PC microprocessor(s) $102_0$, $102_1$, it is designed to be electrically very "close" to the processor bus and thus exhibit very low latency. As noted previously, it is not uncommon for the latency associated with the DIMM to be on the order of only 25% of that of the PCI bus 110. By, in essence, harnessing this bandwidth as an interconnect between computer systems 100, greatly increased cluster performance may be realized.

To this end, by placing a processor element such as a DIMM MAP element 112 in one of the DIMM slots 114, an associated user array can accept the normal memory "read" and "write" transactions and convert them to a format used by an interconnect switch or network. As disclosed in the aforementioned patents and patent applications, in an embodiment of the invention where a processor element may be a DIMM MAP element 112, the DIMM MAP element 112 may include one or more ports, such as chain ports, that enable it to be coupled to processor elements on other boards.

In one embodiment for example, two or more boards each have a DIMM slot that is coupled to a processor element, such as DIMM MAP element 112. The processor element may also be coupled to at least one microprocessor located on each of the boards. Each processor element may include a chain port coupled to a cluster interconnect fabric for passing data to processor elements on other boards, or between processor elements on the same board. The data may be transferred between processor elements as data packets via the cluster interconnect fabric. For example, a chain port may be used to connect to the external clustering fabric over connection 120 to transfer data packets to remote nodes where they may be received by another board. A processor element on the receiving board may extract the data from the data packets and store it until needed by a microprocessor.

This technique results in the provision of data transfer rates several times higher than that of any currently available PC interface such as the PCI bus 110. However, the electrical protocol of the DIMMs may be such that once the data arrives at the receiver, there is no way for a DIMM module within the DIMM slots 114 to signal the microprocessor 102 that it has arrived, and without this capability, the efforts of the microprocessors 102 would have to be synchronized through the use of a continued polling of the DIMM MAP elements 112 to determine if data has arrived. Such a technique would totally consume the microprocessor 102 and much of its bus bandwidth thus stalling all other bus agents.

To avoid this situation, a processor element may be coupled to a bus that transfers communication packets that signal a microprocessor that data has arrived. For example, in one embodiment of the invention, the DIMM MAP element 112 may be coupled to a peripheral bus, such as PCI bus 110, via connection 118. In this embodiment, the DIMM MAP element 112 may generate communications packets and send them via the PCI bus 110 to the microprocessor 102. The conventional PCI interrupt signals may be utilized to inform microprocessor 102 that data has been received by DIMM MAP element 112. Since these communication packets transferred on the PCI bus 110 may be a small percentage of the total data, the low bandwidth bottleneck effects of PCI bus 110 may be minimized.

In another embodiment of the invention, the system maintenance ("SM") bus (not shown) could also be used to signal the processor 102. The SM bus is a serial current mode bus that conventionally allows various devices on the processor board to interrupt the processor 102. In an alternative embodiment, the AGP port may also be utilized to signal the processor 102.

With a DIMM MAP element 112 associated with what might be an entire DIMM slot 114, the PC will allocate a large block of addresses, typically on the order of 1 GB, for use by the DIMM MAP element 112. While some of these can be decoded as commands, (as disclosed in the aforementioned patents and patent applications) many can still be used as storage. By having at least as many address locations as the normal input/output ("I/O") block size used to transfer data from peripherals, the conventional Intel™ chip sets used in most PCs (including controller 104) will allow direct I/O transfers into the DIMM MAP element 112. This then allows data to arrive from, for example, a disk and to pass directly into a DIMM MAP element 112. It then may be altered in any fashion desired, packetized and transmitted to a remote node over connection 120. Because both the disk's PCI bus 110 and the DIMM MAP element 112 and DIMM slots 114 are controlled by the PC memory controller 104, no processor bus bandwidth is consumed by this transfer.

It should also be noted that in certain PCs, several DIMMs within the DIMM slots 114 may be interleaved to provide wider memory access capability in order to increase memory bandwidth. In these systems, the previously described technique may also be utilized concurrently in several DIMM slots 114. Nevertheless, regardless of the particular implementation chosen, the end result is a DIMM-based MAP element 112 having one or more connections to the PCI bus 110 and an external switch or network over connection 120 which results in many times the performance of a PCI-based connection alone as well as the ability to process data as it passes through the interconnect fabric.

Figure 2A:
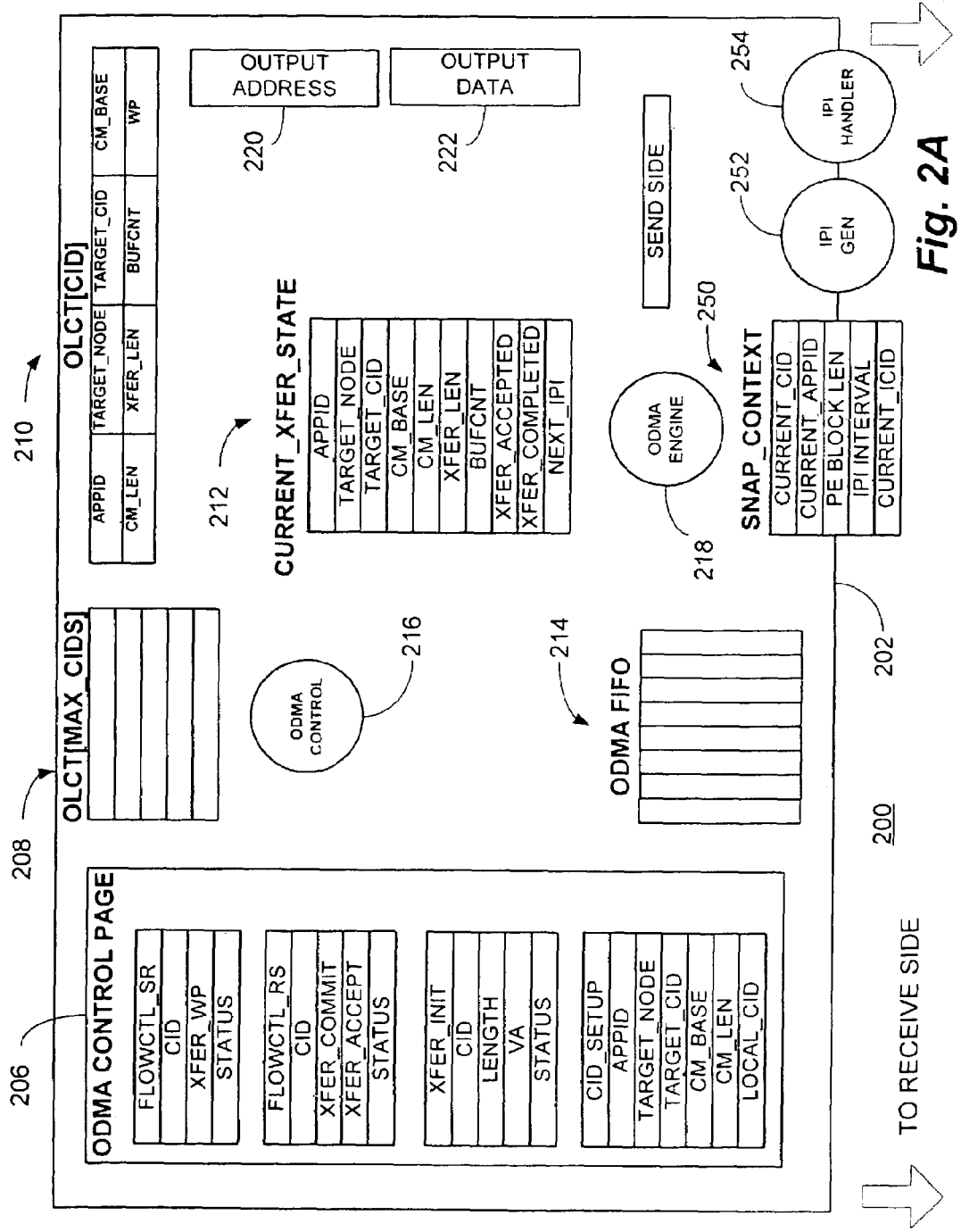
FIGS. 2A and 2B are, respectively, simplified functional block diagrams providing an overview of a send side and corresponding receive side of a connection as exemplified by a SNAP explicit Communication support Facility ("SNAPCF") in accordance with an embodiment of the present invention.
Figure 2B:
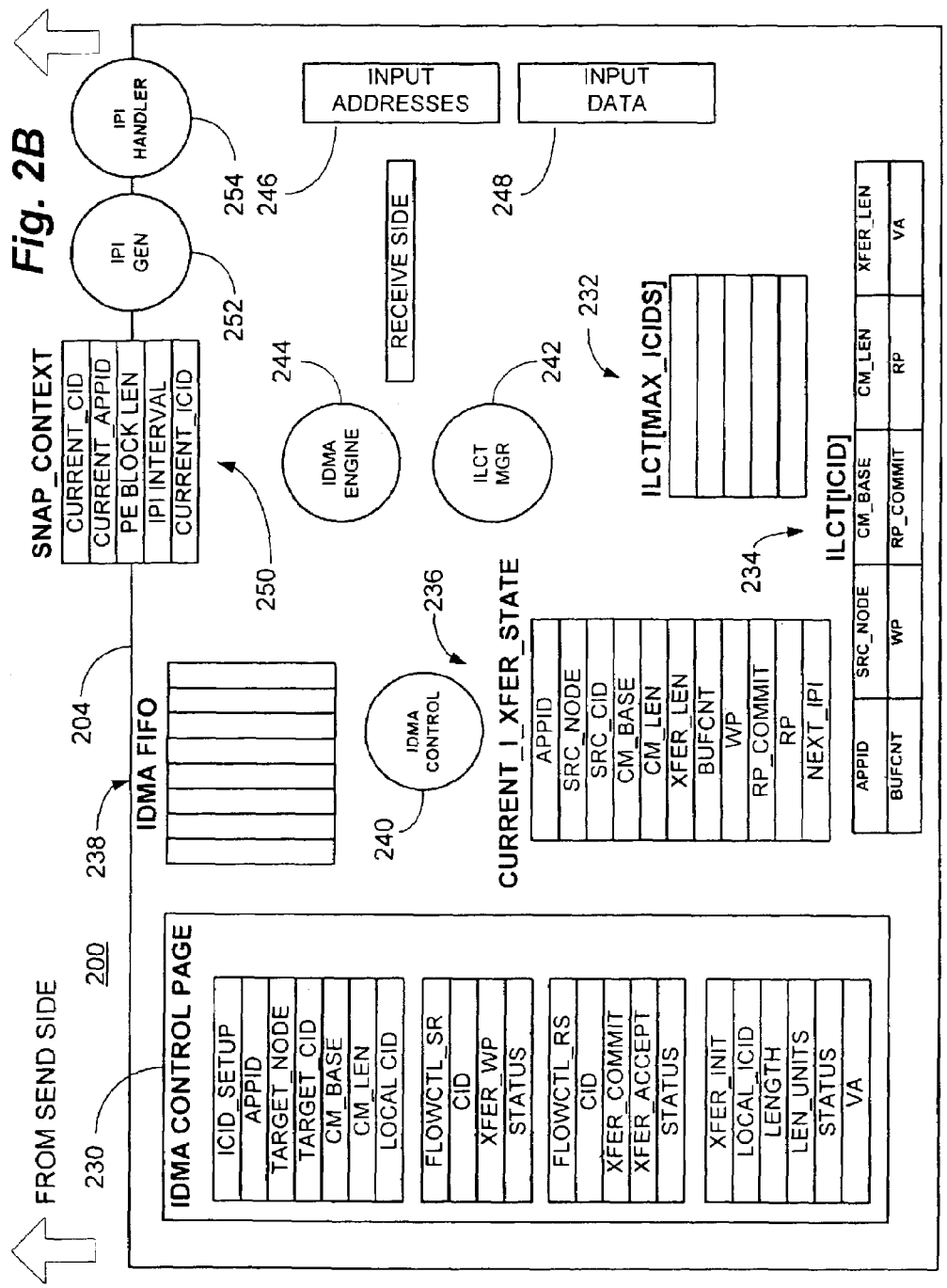

With reference additionally now to FIGS. 2A and 2B, simplified functional block diagrams providing an overview of a send side 202 and corresponding receive side 204 of a connection 200 as exemplified by a SNAP explicit communication support facility ("SNAPCF") in accordance with the present invention is shown. In this example, both the send side 202 and the receive side 204 are exemplified as SNAPs. As will be more fully described hereinafter, particular exemplary SNAP data structures/processes are disclosed for the implementation of a streamlined low-level user-user transport mechanism, for communicating messages between processes and running on different nodes of a cluster connected via the SRC Computers, Inc. Switch/Common Memory ("CM")/SNAP architecture. The mechanism disclosed is considerably simpler than that employed by commercial OS-bypass cluster implementations such as Myrinet/GM, OsNet, VIA, and ST among others.

This simplification is enabled by at least two significant differences between the SRC Computers, Inc. platform and existing I/O based clusters. As a preliminary matter, the mechanism of the present invention disclosed herein may be operative on the assumption that the send and receive sides of any given transfer can be partially or fully decoupled via a per-connection memory buffer, which buffer is dedicated to that particular point-to-point connection. This not only may allow the send side to buffer up large amounts without requiring acknowledgement from the receive side SNAP, but also may allow the receive side SNAP to decide which connection it wishes to service at any given instant. This can greatly simplify the SNAP processing requirements, since the receive side logic may only have to handle the data for one connection at a time.

The SNAP, by virtue of its DIMM slot interface, may be a wholly passive device from the point of view of the PC-board processors. Although this can have disadvantages for an application that might otherwise be able to utilize asynchronous communication, it also may relieve the communication hardware of the need to perform virtual address translation on incoming data, given an appropriate connection-based protection mechanism and the ability to allocate non-privileged control of the SNAP to a given user process.

Although the representative protocol may include provisions for coping with known transmission errors between a processor and SNAP, it may not include a mechanism for detecting such errors. A mechanism for error detection may be independently implemented outside of the protocol and decisions as to whether to forward data written to first-in, first-out registers ("FIFOs") may be made purely on the basis of status, which may be determined at a lower level.

With particular reference now to FIG. 2A, the send side 202 of the connection 200. In this example, the connection 200 may comprise, in pertinent part, an outgoing direct memory access ("ODMA") control page 206. The ODMA control page 206 may contain registers for flow control send/receive ("FLOWCTL_SR"), flow control receive/send ("FLOWCTL_RS"), transfer initialization ("XFER_INIT") and connection table index setup ("CID_SETUP"). The FLOWCTL_SR register may include connection table index ("CID"), transfer write pointer ("XFER_WP") and status ("STATUS") entries while the FLOWCTL_RS register may include associated CID, transfer commit ("XFER_COMMIT"), transfer accepted ("XFER_ACCEPT") and STATUS entries. The XFER_INIT register includes CID, length ("LENGTH"), virtual address ("VA") and STATUS entries while the CID_SETUP register includes application identifier ("APPID"), target node ("TARGET_NODE"), target CID ("TARGET_CID"), common memory base ("CM_BASE"), common memory length ("CM_LEN") and local CID ("LOCAL_CID") entries. The entries in the ODMA control page 206 may be overlaid with one block active at a time.

The send side 202 of the connection 200 may further comprise outgoing local connection table ("OLCT") maximum CIDs ("OLCT[MAX_CIDS]") table 208 and OLCT [CID] table 210 which will be more fully described hereinafter. The OLCT[CID] table 210 includes entries for: APPID, TARGET_NODE, TARGET_CID, CM_BASE, CM_LEN, transfer length ("XFER_LEN"), buffer count ("BUFCNT") and write pointer ("WP") entries. A current transfer state ("CURRENT_XFER_STATE") table 212 may include entries for: APPID, TARGET_NODE, TARGET_CID, CM_BASE, CM_LEN, XFER_LEN, BUFCNT, transfer accepted ("XFER_ACCEPTED"), transfer completed ("XFER_COMPLETED") and next IPI ("NEXTJIPI") fields as shown. An ODMA first-in, first-out ("FIFO") buffer 214 may be included along with an ODMA control block 216 and ODMA engine 218 as will also be more fully described hereinafter. Respective output address and output data buffers 220 and 222 may also be included.

With specific reference additionally now to FIG. 2B, the receive side 204 of the connection 200 may comprise, in pertinent part, an incoming direct memory access ("IDMA") control page 230. The IDMA control page 230 may contain registers for incoming CID setup ("ICID_SETUP"), FLOWCTL_SR, FLOWCTL_RS and XFER_INIT. The ICID_SETUP register may include entries for APPID, TARGET_NODE, TARGET_CID, CM_BASE, CM_LEN and LOCAL_CID entries. The FLOWCTL_SR register may include CID, XFER_WP and STATUS entries while the FLOWCTL_RS register may include associated CID, XFER_COMMIT, XFER_ACCEPT and STATUS entries. The XFER_INIT register may include CID, local CID, ("LOCAL_CID"), LENGTH, length units ("LEN_UNITS"), STATUS and VA entries.

The receive side 204 of the connection 200 may further comprise incoming local connection table ("ILCT") maximum CIDs ("ILCT[MAX_CIDS]") table 232 and ILCT [CID] table 232 which will be more fully described hereinafter. The ILCT[CID] table 234 may include entries for: APPID, source node ("SRC_NODE"), CM_BASE, CM_LEN, XFER_LEN, BUFCNT, WP, read pointer commit ("RP_COMMIT") and read pointer ("RP") entries. A current incoming transfer state ("CURRENT_I_XFER_STATE") table 236 may include entries for: APPID, SRC_NODE, SRC_CID, CM_BASE, CM_LEN, XFER_LEN, BUFCNT, WP, RP_COMMIT, RP and NEXT_IPI as shown. An IDMA FIFO buffer 238 may be included along with an IDMA control block 240, ILCT manager ("ILCT MGR") 242 and an IDMA engine 244 as will also be more fully described hereinafter. Respective input address and input data buffers 246 and 248 may also be included.

As shown, the send side 202 and receive side 204 may have certain shared states and functionality as illustrated by the SNAP_CONTEXT table 250 illustrated in both FIGS. 2A and 2B. The SNAP_CONTEXT table 250 may have entries for current CID ("CURRENT_CID"), current APPID ("CURRENT_APPID"), processor expected block length ("PE_BLOCK_LEN"), IPI interval ("IPI_INTERVAL") and current incoming CID ("CURRENT_ICID") entries. The send and receive sides 202, 204 may also include a shared IPI generator ("IPI GEN") 252 and IPI handler ("IPI HANDLER") 254 as will be more fully discussed hereinafter.

One purpose of SNAP, developed by SRC Computers, Inc., is to enable commodity personal computer ("PC") boards to serve as processing nodes in a scalable computer, featuring both conventional and reconfigurable multi-adaptive processors (MAP™, a trademark of SRC Computers, Inc., assignee of the present invention), all connected through the SRC switch/Common Memory ("CM"). In contrast with the SRC-6 computer, the conventional processors may not have load/store access to the global common memory and access is instead through memory mapped FIFOs on the SNAP, coupled with programmable direct memory access ("DMA") between SNAP and the switch/CM.

In principle this capability, coupled with a technique for generating remote processor interrupts, can enable end-to-end communication between microprocessors on the same or different boards. For example, FIG. 1 shows an embodiment of this capability and technique using microprocessors $102_0$ and $102_1$ and/or the MAP elements 112 comprising system 100. In practice, however, the setup/protocol overhead associated with a message passing implementation that operates directly between the participating processors $102_0$ and $102_1$ may be problematic. Furthermore, a point-to-point protocol that requires dedicated use of the SNAPs (or SNAP plus MAP) at both ends of the connection may present scalability issues.

The relative abundance of reconfigurable logic in SNAP affords the opportunity to implement a high-performance, lightweight explicit communication processing capability on top of the basic SNAP DMA functionality referred to above. Simulation results indicate that such a feature would enable implementers to deliver greater message passing throughput than otherwise achievable by any existing commercially available cluster interconnect. Similarly the potential exists to achieve message startup overhead comparable to that exhibited by competing operating system ("OS")-bypass capable cluster solutions, for both two-sided message passing interface ("MPI" send/receive) and one-sided (MPI2/shared memory access library "SHMEM") explicit communication protocols.

The envisaged functionality of the connection 200, as previously described, includes send and receive sides 202, 204 which are largely separate, with some shared storage for configuration/context in the SNAP_CONTEXT table 250. IPI generation and handling logic is shared by means of the IPI GEN 252 and IPI HANDLER 254. Communication between the send and receive sides 202, 204 is accomplished over persistent, unidirectional point-to-point connections, each of which may have an outgoing connection descriptor (OLCT entry) at the source side, a corresponding incoming connection descriptor (ILCT entry) at the destination, and a per-connection memory buffer, that may be a dedicated portion of the common memory.

In the exemplary embodiment of the present invention disclosed herein, connection setup is OS privileged, takes place at application startup time, and requires coordination/communication between the OS instances running on the source and destination nodes. The channel used for this initial operating system to operating system communication is a matter of design choice, but may use "raw" PE→SNAP->CM communication under software control. Once set up, each connection provides a user-accessible path between the send side 202 output FIFO 214 and the receive side 204 input FIFO 238.

At any given time the SNAP(s) associated with each processor may be under restricted control of a single application process, which may be a participant in a cluster wide collection of communicating processes, grouped under a single identifier or APPID.

On the send side 202, the currently controlling process may determine the active connection, by means of control page writes for transfer initialization/resumption. The process may send on a connection 200 (which have previously been set up by the operating system) owned by its APPID.

On the receive side 204, The SNAP IDMA control logic 240 determines the currently active connection, selecting from those entries in the ILCT which both have the currently controlling processes' APPID, and have outstanding data buffered up in CM for transmission. This obviates the need for processor directed scheduling of incoming transfers, which would otherwise incur prohibitive overhead, especially in the case where there are many possible potential sources of incoming data. This mechanism includes having the receive side 204 being serviced by a dedicated application thread, operating in the same VA space as the controlling application, which may be responsible for polling the IDMA control page 230 for incoming transfers and reading the data from the IDMA FIFO 238 into the correct target memory locations.

It is anticipated that the large number of processor accessible registers in the IDMA and ODMA control pages 230, 206 could be too many to accommodate directly and may require a supplementary access mechanism, such as by overlaying small blocks, as illustrated. Under this arrangement, the processor $102_0$ or $102_1$ would issue a control write (to a particular register, not shown) to switch between active register blocks.

Outgoing Local Connection Table (OLCT).

With respect to the send side 202, the OLCT[CID] table 210 may contain an entry for each outgoing point-to-point connection 200 originating from the local node. The table 210 is maintained by the ODMA control logic 216. The connection 200 may set up by the processor $102_0$ or $102_1$ by writing the connection table index ("CID"), APPID, TARGET_NODE, TARGET_CID, base address, and address length for the connection's CM buffer to the CID setup registers which is generally an operating system privileged operation.

The CID entry 210 in the OLCT table 208 is updated by the ODMA control logic 216 whenever the XFER_INIT or CID_SETUP registers in the ODMA control page 206 are written, and whenever the active outgoing connection is switched. A possible format for this functionality may be as follows:

```
#define MAX_CID_ENTRIES 2048
/* Snap per outbound connection data. Data is copied from this table
   into/out of Current_xfer_state whenever Current_CID changes */
struct OLCT_t { /* index = Local CID */
    unsigned APPID         :5;   // Max 16 system wide
                                 application IDs
    unsigned Target_Node   :10;  // Max 1024 Target SNAPS
    unsigned Target_CID    :11;  // Allows for a single NxN
                                 application
                                 // extra for houskeeping, etc
    unsigned CM_Base       :32;  //
    unsigned CM_Length     :3 ;  // Connection buffer length
                                 // 4kb->1MB, log2 4kb units
```

-continued

```
    unsigned Xfer_Len      :24;  // 128 byte lines, rounded up
                                 from
                                 // actual transfer length.
    unsigned Xfer_Bufcnt   :8 ;  // Number of complete buffers
                                 sent for
                                 // current transfer
    unsigned CM_WP         :12;  // Transfer write pointer
                                 within
                                 // buffer (Num 128 Byte CLs).
    Unsigned CM_Completed  :
} OLCT[MAX_OLCT_ENTRIES];
```

CURRENT_XFER_STATE

The OLCT entry for the currently active outgoing transfer may be duplicated in the CURRENT_XFER_STATE table 212, which also may include fields to track the progress of the active transfer: XFER_ACCEPTED, XFER_COMPLETED and NEXT_IPI XFER_COMPLETED. These fields may not be present in the OLCT itself, because the transfer may be idled prior to switching.

ODMA FIFO

The ODMA FIFO 214 is the destination for processor $102_0$ or $102_1$ writes to the data page, and the source for ODMA engine 218 write data.

ODMA Control

The ODMA control 216 monitors the control page for commands, updates processor $102_0$ and/or $102_1$ accessible status, SNAP Context, and the OLCT as necessary, and manages the switching between active APPID's, transfers as required. Its functionality may include updating the OLCT on receipt of connection setup control page write (CID_SETUP); and switching between active transfers on receipt of transfer startup control page write (XFER_INIT). It should be noted that the current transfer should be idle (that is, the ODMA FIFO 214 should be empty) on receipt of this message, at which time: The ODMA engine 218 should be blocked (CURRENT_XFER_STATE invalid), and CURRENT_XFER_STATE should be written back to the OLCT. The OLCT entry for the new transfer CID should be written to CURRENT_XFER_STATE. Unless the resume flag is set (i.e., processor 102 written in XFER_INIT_STATUS), the transfer length should be copied from the control page into CURRENT_XFER_STATE, and the transfer progress fields (XFER_ACCEPTED, XFER_COMPLETED, NEXT_IPI) should be initialized. The ODMA engine 218 should be released to process the transfer as data comes into the ODMA FIFO 214. (CURRENT_XFER_STATE is valid), as well as processing incoming transfer progress IPIs and updating CURRENT_XFER_STATE, the FLOWCTL_RS control page registers and the OLCT to reflect committed CM read pointers (XFER_COMPLETED).

It should be noted that progress IPIs may be ignored for transfers other than the current CID but some mechanism would be needed to ensure that transfers which were uncommitted by completely accepted at the time of "switch out" get notified to the user as complete (or aborted, etc.) at the time of "switch in". This would effectively obviate the need to store or update the read pointer in OLCT.

ODMA Engine

The ODMA engine 218 and associated logic may be responsible for: Generating CM write requests (based on CURRENT_XFER_STATE) and transporting data from the ODMA FIFO 214 to the switch request buffer; updating CURRENT_XFER_STATE (BUFCNT, XFER_

ACCEPTED, and NEXT_IPI) to reflect the SNAP to CM transfer progress; and triggering the IPI GEN 252 and resetting the NEXT_IPI counter whenever IPI_INTERVAL lines have been sent since the last IPI.

In addition to the above, the ODMA engine 218 should also retain its existing ability to be programmed directly via control page writes. This "raw" access mode may be set via switching to a permanently defined, system privileged CID.

Input Local Connection Table (ILCT)

With respect to the receive side 204, the ILCT[ICID] table 232 may contain an entry for each incoming point-to-point connection originating from the local node. Connection status is maintained by the ILCT Manager 242, with connection setup being performed by the IDMA control logic 240, in response to operating system privileged IDMA control page 230 CID setup writes. One possible format is as follows:

```
struct ILCT_t { /* index = Local CID */
    unsigned APPID          :5;   // Max 16 system wide ap-
                                  plication IDs
    unsigned Src_Node       :10;  // Max 1024 Source SNAPS
    unsigned Src_CID        :11;  // Send side SNAP OLCT
                                  index for CID
    unsigned CM_Base        :32;  //
    unsigned CM_Length      :3;   // Connection buffer length
                                  // 4kb->1MB, log2 4kb units
    unsigned Xfer_Len       :24;  // 128 byte lines, rounded up
                                  from actual
                                  // transfer length.
    unsigned Xfer_Bufcnt    :8 ;  // Number of complete buffers
                                  sent for
                                  // current transfer
    unsigned CM_WP          :12;  // Transfer CM write pointer
                                  within
                                  // buffer (Num 128 Byte
                                  CLs).(from IPI)
    unsigned CM_RP_Commit   :8;   // Commited CM read pointer
                                  within
                                  // buffer. i.e. PE has
                                  acknowledged receipt.
    unsigned CM_RP          :8;   // CM read pointer within
                                  buffer
                                  // i.e. has been read into input
                                  FIFO
    unsigned VA             :64;  // Base Virtual address for
                                  incoming
                                  // transfer. (or other higher
                                  level
                                  // protocol immediate data
                                  (e.g. cplant
                                  // portal descriptor))
} ILCT[MAX_ICIDS];
```

Note that in contrast with the output (or send) side 202, ILCT entries for transfers other than the current incoming transfer may not need to be updated in the ILCT, since IPIs from the send side 202 of each connection can arrive at any time and the ILCT manager 242 should have accurate common memory write pointers and the like in order to determine which incoming connections are in need of servicing.

In the particular embodiment disclosed herein, the base VA should be present in the ILCT, since an XFER_INIT message can normally only be sent to the processor 102 at the point where the active incoming connection is being switched. Since the VA may be part of the incoming transfer init IPI, whose transmittal to the processor 102 is capable of being deferred until the next (or later) active transfer switch, the information in the IPI should be stored in the ILCT entry for the relevant CID. If storage is at a premium, the storage requirement could be reduced by storing the (e.g. 12 bit) index into a table of Transfer Init IPI immediate (i.e. VA) data, rather than the VA itself.

CURRENT_I_XFER_STATE

The ILCT entry for the currently active outgoing transfer may be duplicated in the CURRENT_I_XFER_STATE table 236 that may also include fields required to track the progress of the active transfer. (WP, RP, RP_COMMIT and NEXT_IPI).

IDMA FIFO

The IDMA FIFO 238 may be the destination for IDMA engine 244 read data, and the source for data page read responses to the processor 102.

IDMA Control

The IDMA control 240 may be responsible for: Updating the ILCT on receipt of connection setup control page write (CID_SETUP); identifying connections which are in need of servicing (i.e., (CM Write pointer !=CM Read Pointer) in ILCT entry, && (ILCT[CURRENT_ICID] .APPID=CURRENT_APPID)); prioritizing between the currently waiting incoming connections identified previously; generating transfer startup notifications (IDMA control page 230 XFER_INIT register contents) on selection of an active transfer whose existence has not yet been notified to the processor 102; and switching the currently active transfer when necessary in accordance with a scheduling algorithm such as Round Robin, switch on idle and as with the output, or send side 202. The currently active transfer should be idle before a switch can occur (i.e., the IDMA FIFO 238 should be empty, the processor 102 should have acknowledged receipt of all data and the receive to send transfer commit IPI (FLOWCTL_RS) should have been sent for all data accepted by the processor 102.

In order to preclude the possibility of a single incoming connection monopolizing the SNAP for a long period, whilst others are waiting, the IDMA control 240 may have the capability to idle the IDMA engine 244 even though there may still be unread data for the current incoming connection present in common memory. Once the current transfer is idle, the switch may be accomplished by blocking the IDMA engine 244 (i.e. the CURRENT_I_XFER_STATE is invalid). If the previously active transfer is incomplete, the transfer suspend flag in the IDMA control page 230 (part of FLOWCTL_RS_STATUS) may be set to indicate to the processor 102 that the current transfer is suspended and it should poll for a new transfer init message (writing back CURRENT_I_XFER_STATE to the ILCT is not required since transfer is idle and the ILCT is updated directly by the ILCT manager 242); selecting the next transfer (i.e. ICID) to become active; copying the ILCT entry for the new Current ICID to CURRENT_XFER_STATE; updating the XFER_INIT registers in the IDMA control page 230 with the details of the new (or resumed, if pre-existing) transfer, and setting the valid bit in XFER_INIT_STATUS; and releasing the IDMA engine 244 to progress the transfer as data comes into the IDMA FIFO 238, (CURRENT_XFER_STATE is valid).

ILCT Manager

The ILCT manager 242 may be responsible for updating the ILCT in response to incoming transfer startup and progress IPIs and whenever the processor 102 writes to the FLOWCTL_RS registers in the IDMA control page 230. In this regard, it should be noted that any valid CID may need to be updated, not just that for the current incoming transfer. In the case where the update relates to the current transfer, the relevant fields (i.e., BUFCNT, WP) in the currently active transfer state may be updated in parallel with the ILCT entry.

IDMA Engine

The IDMA engine 244 and associated logic may be responsible for: Generating common memory read requests (based on CURRENT_I_XFER_STATE) and transporting data from the switch response buffer to the IDMA FIFO 238; updating CURRENT_XFER_STATE (BUFCNT, XFER_ACCEPTED, and NEXT_IPI) to reflect the SNAP to per-connection memory buffer transfer progress; and maintaining the write pointer in the FLOWCTL_SR IDMA control page 230 to allow the receive side 204 processor 102 to determine the amount of data available to be read from the IDMA FIFO 238. As with the send side 202, the IDMA engine 244 should also retain its existing ability to be programmed directly via control page writes, or "raw" access mode.

Shared State/functionality.

SNAP_CONTEXT

With reference to both FIGS. 2A and 2B, SNAP_CONTEXT table 250 is a generic location for non-transfer-specific context information which relates to the current APPID and is written via operating system privileged control page writes whenever the controlling user process is changed. The SNAP_CONTEXT table 250 may include the following entries:

CURRENT_CID—the current outgoing connection ID which may be used to select the OLCT entry of the currently active connection;

CURRENT_APPID—used to protect connections not associated with the currently controlling process;

PE_BLOCK_LEN—the amount of data which the processor 102 is expected to write between each ODMA control page 206 FLOWCTL update/status poll;

IPI_INTERVAL—the number of lines to be written by the ODMA engine 218 before sending a flow control IPI to the receive side 204 SNAP and also used to schedule progress IPIs from receiving to sending SNAP; and CURRENT_ICID—the index into the ILCT for the currently active incoming transfer.

IPI Generation/IPI Handler

IPI generation 252 is responsible for inserting IPI packets into the output stream. The format of the IPI packet payload may be as follows:

```
#define IPI_MSG_STARTUP      1
#define IPI_MSG_FLOWCTL_SR   2
#define IPI_MSG_FLOWCTL_RS   3
#define IPI_MSG_STATUS       4
struct IPI_Data_t {
    unsigned Target_Node    :10;   // actually part of
                                   IPI target
                                   // address
    unsigned Msgtype        :3;    //startup|flowctl_
                                   SR|flowctl_RS
    unsigned CID            :11;   // index into target
                                   SNAP
                                   // [I|O]LCT
    union {
    {
    unsigned length         :24;   // startup only
    uint64 VA:              // :64; startup only
        }startup_data;
```

-continued

```
    unsigned WP;            :24;   // send->recv flowctl.
    unsigned RP;            :24;   // recv->send flowctl.
                                   // RP=WP=
                                   length=DONE.
    uint64 status;                 // :64; error
                                   reporting, etc.
        }pay load;
};
```

The IPI handler 254 at the target SNAP sinks the IPI packets and forwards them for processing. An example description of the triggering events/actions may go as follows:

Transfer Startup IPI

This may be triggered by ODMA control 216 on receipt of a valid XFER_INIT message from the processor 102. On receipt, the message may be forwarded to ILCT manager 242, which updates the connection table entry for the indicated CID. It should be noted that overwriting details of a currently incomplete transfer is legal from the point of view of SNAP but the receive side 204 controlling process should be set up to handle it, for example, by detecting that the resume flag is not set when the CID next becomes active, and taking appropriate action.

Forward Flow Control IPI

This may be triggered by the ODMA engine 218 when it has written IPI_INTERVAL lines for the current transfer and after the last line of the transfer has been written to the per-connection memory buffer. On Receipt at the receive side SNAP, data may be forwarded to ILCT manager 242, which may update the common memory write pointer in the ILCT entry indicated by the CID field in the IPI data.

Return Transfer Progress Notification IPI

This may be triggered by the ILCT Manager 242 whenever a new XFER_COMMIT value is written to the XFER_COMMIT register in the FLOWCTL_RS block of the IDMA control page 230. This can happen in parallel with the update of the RP_COMMIT field of the ILCT entry for the current incoming transfer. On receipt by the a SNAP (i.e. the send side 202) the IPI handler 254 may forward the data to ODMA control block 216, which updates the OLCT and ODMA control page 206 FLOWCTL_RS registers to reflect the transfer progress as previously described.

SNAPCF: Programming Interface

The software that supports application use of the explicit communication facility may include the following components:

I. OS/Kernel Support

1. User Memory-Mapped SNAP Communication Interface (SNAPCI) Allocation/management.

Context switch SNAPCI between user processes involves idling the communication interface, reading/writing APPID specific context, and unmapping/remapping control pages.

2. OS←→OS Low-level Cross-cluster Communication Support.

This may include the use of "raw" SNAP→common memory data transfers to permanent common memory mailbox plus remote interrupts to indicate message waiting. Since this communication may be relatively inefficient, it should be used only for infrequent communication between OS instances. It may also be used to enable Application Workgroup and Connection setup.

3. SNAPCI System Call Support:

At application startup, the user process can establish itself as a participant in the distributed application, (APPIDJoin) and obtain a Virtual PE number (Get_MYPE). Once this has been done, connections can be established using Virtual PE numbers to specify source and destination.

Join Application Workgroup APPID_t APPIDJoin (AppMagic)

AppMagic is registered with the OS, and may be supplied to the application by whatever high-level parallel launcher is in use.

```
First Process to join gets MYPE= 0, second gets 1, etc. Requires
centralized Physical SNAPIF → Virtual Processor Mapping in common
memory
Get my (virtual) processor number Int Get_MYPE(APPID)
Obtains the Virtual PE number established at APPIDJoin time.
Lookup on centralized table (or preferably cached by OS at
APPIDJoin time)
Establish Connection CID_t SetupCID(APPID, MYPE, DestPE) (send
side)                                                      (pending
connection struct) GetPendingConnection (APPID)
CID_t         SetupICID (APPID,
Connection is point to point, unidirectional, and created from
send side.
Connection setup involves:
Send side app/library code:
     Outgoing_CIDs[DestPE] = SetupCID (APPID, MYPE, DestPE);
Send side OS: {
Lookup Physical SNAP number for DestPE (in central mapping for
APPID)
     Allocate common memory buffer for Connection.
     Reserve local outgoing CID (In OS table only)
Request target CID from remote PE ("raw" mode mbox msg specifying
APPID, Src_Node, CM_Base, CM_Length, Send side CID)
.........(poll common memory for response or on receipt of remote
interrupt).........
If target CID obtained
Write CID_SETUP control message to local SNAP and poll for good
status.
else if (error = no process with APPID)
     (retry- app might not have launched yet.)
else fatal
Receive side (OS interrupt handler): {
If there is a process with matching APPID {
Store init request in pending queue
Signal target application process to pickup details of pending
connection .
}
Receive side application signal handler:{
          While SNAPCIctl( get new connection details) != NULL {
Incoming_CIDS[SrcPE] = SetupICID(new connection details)
Update SNAP CI listener data structures to expect incoming
transfers on new CID.
}
}
Receive side (OS SetupICID code): {
Format ICID setup request (using info from pending queue)
Write SNAP ICID_Setup control page registers and poll for good
status
Send Mbox msg to target PE containing local ILCT index for
connection.
Delete ICID setup request from pending queue
Return ICID to calling app.
}
Tear down connection       int      DestroyCID(APPID,CID)
Leave Application Workgroup    int       APPIDDetach(APPID)
```

Send Side Application Library Transfer Initiation/processing.

The send routine should be capable of being interrupted and potentially losing/regaining control of the connection 200 during execution. The OS should guarantee, however, data acknowledged as being received by SNAP has been delivered to the per-connection memory buffer. Data sent after the last accept message, but before context switch, may also be written to the memory buffer, but may get bad status on the next FLOWCTL_RS poll, which may cause the application to resend of all data after the last accept.

It should be noted that the VA parameter may be passed directly to the receive side 204 process as part of transfer setup. For SHMEM implementation the VA would actually be a destination starting address in a form directly usable by the target application. For MPI, this may be (for example) a cplant portal handle or other port identifier:

```
Status = SNAPCF_SEND(CID, VA, localbuffer, Xfer_length) {
     Format transfer startup message and write to ODMA control page
     Xfer_Init registers.
     /* we don't poll for status on the init msg. Simply start
     inputting
     data into the ODMA FIFO in the sure knowledge that the SNAPCF
     will
     eventually figure out what to do with it.*/
     /*run_ahead allows several blocks to be written through SNAP
     to CM
     before first status is polled (to fill PE→PE pipe.) Block
     length is
     the number of lines transferred between status checks, and is
     the same
     as the SNAP_context PE_Block_Length register contents*/
     run_ahead = (number of blocks needed to prime the pump)
     While (accepted_Xfer_offset < Xfer_Length) && (run_ahead >0 )
     {
          Write next block to SNAP ODMA data FIFO.
          Write CID, + offset of last line written(Xfer_WP) to
          SNAP ODMA
          control page flowctl_SR register
          Run_ahead--;
          If (run_ahead = = 0) {
               While flowctl_RS.status = = invalid {
                    Poll SNAP ODMA control page flowctl_RS register.
               }
               if flowctl_RS.status is bad
                    reset block_offset to last_xfer_accept
               else
                    last_xfer_accept = flowctl_RS.xfer_accept.
          }
     }
     While (committed_Xfer_offset < Xfer_length) {
          Poll SNAP ODMA control page flowctl_RS register for
          committed
          completion.
     }
}
```

Receive Side Listener (Connection Service Thread) Processing.

The receive side connection (e.g., SNAPCF) service thread, which may operate in the same virtual address space as the main application processing thread for the local APPID, may be dedicated to processing incoming SNAPCF transfers. Depending on the message passing model in use, the service thread may either deposit the incoming data into application memory directly, (based on the VA in the transfer init message plus transfer offset (e.g., SHMEM) or it may place it in a library buffer for processing by the message passing library receive routine running in the main application processing thread (e.g., MPI). In the latter case, the transfer init message VA field could be used to support zero-copy user-mode messaging (e.g., Cplant/Sandia "portal")

In either case, the service thread must be able to digest chunks of data for any currently established incoming CID for the current APPID (i.e., the APPID which currently has user-mode control of the SNAP). This is because control over which connection is being serviced normally resides with the SNAP IDMA control 240, rather than the service thread. To this end, the thread may maintain a table of incoming CIDs, along with the base "VA" (such as portal IDs, for example) and current transfer offset for each.

Switching the incoming stream between CIDs may be accomplished via a suspend flag and a resume flag. The suspend flag in the IDMA control page 230 FLOWCTL_SR status, may be set by the connection 200 (i.e., SNAPCF) after the IDMA FIFO 238 has been drained for the current transfer and indicates to the listener that it should poll for a new IDMA XFER_INIT message. The resume flag in the IDMA control page 230 XFER_INIT status indicates to the listener that the init message relates to an already partially completed transfer.

Although SNAPCF will always set the resume flag when it selects a transfer with a non-zero offset for servicing, it is allowed (from the Point of view of SNAPCF) for the owner of the sending CID to initiate a new transfer on the CID, even though the old one is incomplete. In this case the SNAP ILCT offset would be reset to zero, and the resume flag would not be set when the CID was next made active.

A typical processing sequence for the receive side SNAPCF service thread is outlined below:

```
While ( ) {
    /* poll for message startup/resume msg */
    While (IDMA control page Xfer_Init.status & INVALID) {
        Poll IDMA control page Xfer_Init register
    }
    if (Xfer_Init.status & RESUME) {
        retrieve existing transfer write pointer+VA from CID
        table.
    } else {
        initialise new transfer for CID indicated by Xfer_init
        register
        values.
    }
    While transfer incomplete && ! (flowctl_SR.status & SUSPEND)
    {
        While (IDMA control page flowctl_SR.status & INVALID)
            Poll IDMA control page flowctl_SR register for
            progress
            message.
        If (IDMA control page flowctl_SR.status & BLK_
            TRANSFER_ERROR)
            (last block read was bad. SNAPCF will reread CM
            from end
            of last good block. Reset WP to last known good,
            and
            poll status again for Ready to Send)
            else        //      last block was good. SNAPCF has
        buffered
        flowctl_SR.WP lines in FIFO
            Num_lines_to_be_read = flowctl_SR.WP -
            old WP
            For each waiting line {
                Copy line from FIFO to transfer base VA+
                offset
                ***See Note below ***
                Increment transfer offset
            }
        }
        update status and write IDMA control page flowctl_RS
        register
        with new read pointer.
    }
    if (flowctl_SR.status & SUSPEND) {
        /* last status read indicated that the fifo is empty
        and
        current transfer will be switched. Save current
        transfer state
        */
    }
}
```

It should be noted that if data is actually bad and the target is user memory rather than a library buffer, this copy may trash the valid user memory. For this reason SHMEM programs might need to stage the data through an intermediate buffer, and hold it there pending confirmation of good status for the block before copying to target memory. No problem would be anticipated as the buffer will always be in cache and it might actually speed things up slightly since it allows time in order to prefetch the real target line (which would probably not be in cache). It should also be noted that the data in memory would be bad until later overwritten with the good values—that is, there should not be a problem if the target is a library buffer.

Figure 3A:
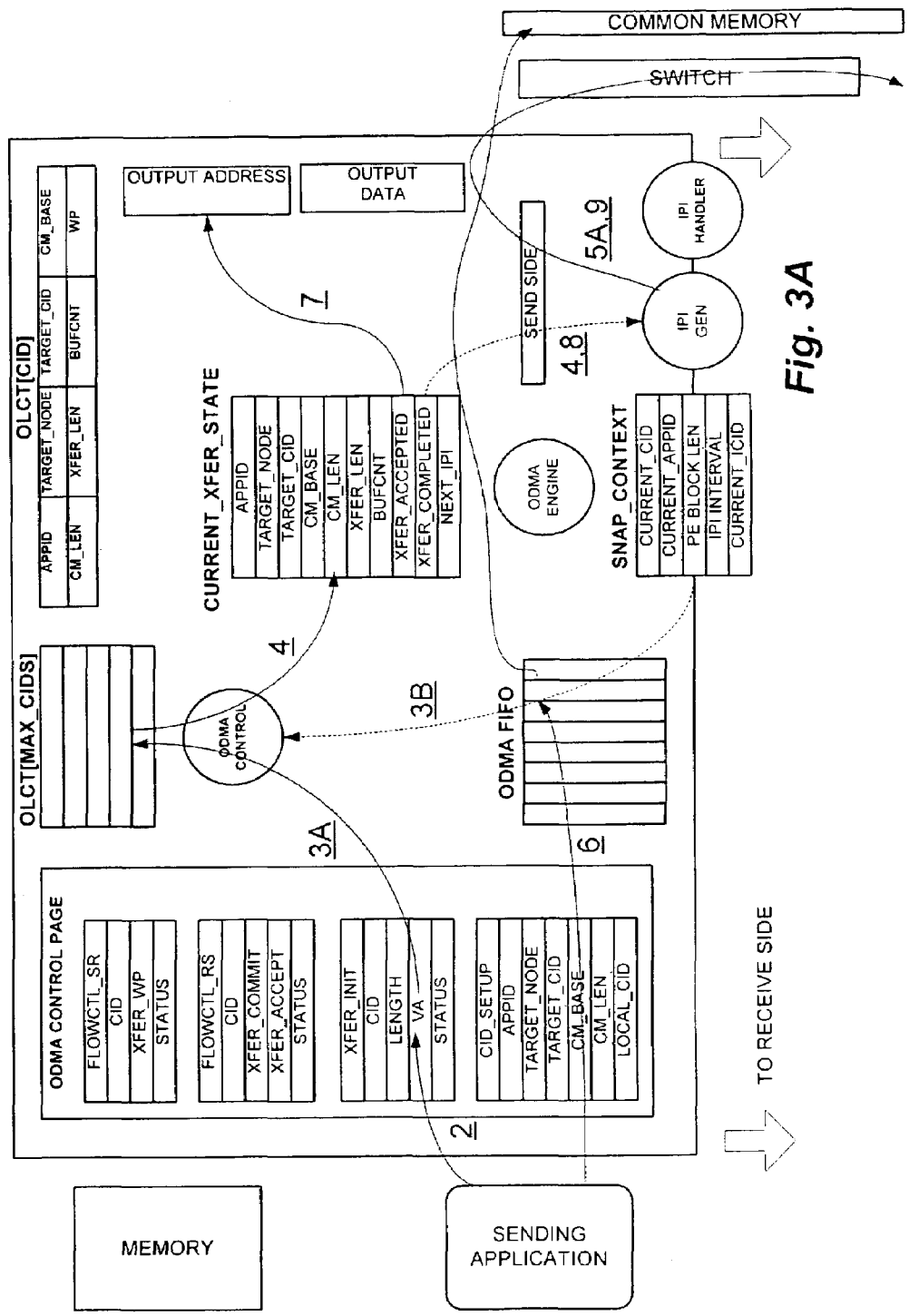
FIGS. 3A and 3b are, respectively, the send and receive sides of the connection as exemplified by the SNAPCF shown in the preceding two figures illustrating a representative end-to-end processing example in accordance with an embodiment of the present invention.
Figure 3B:
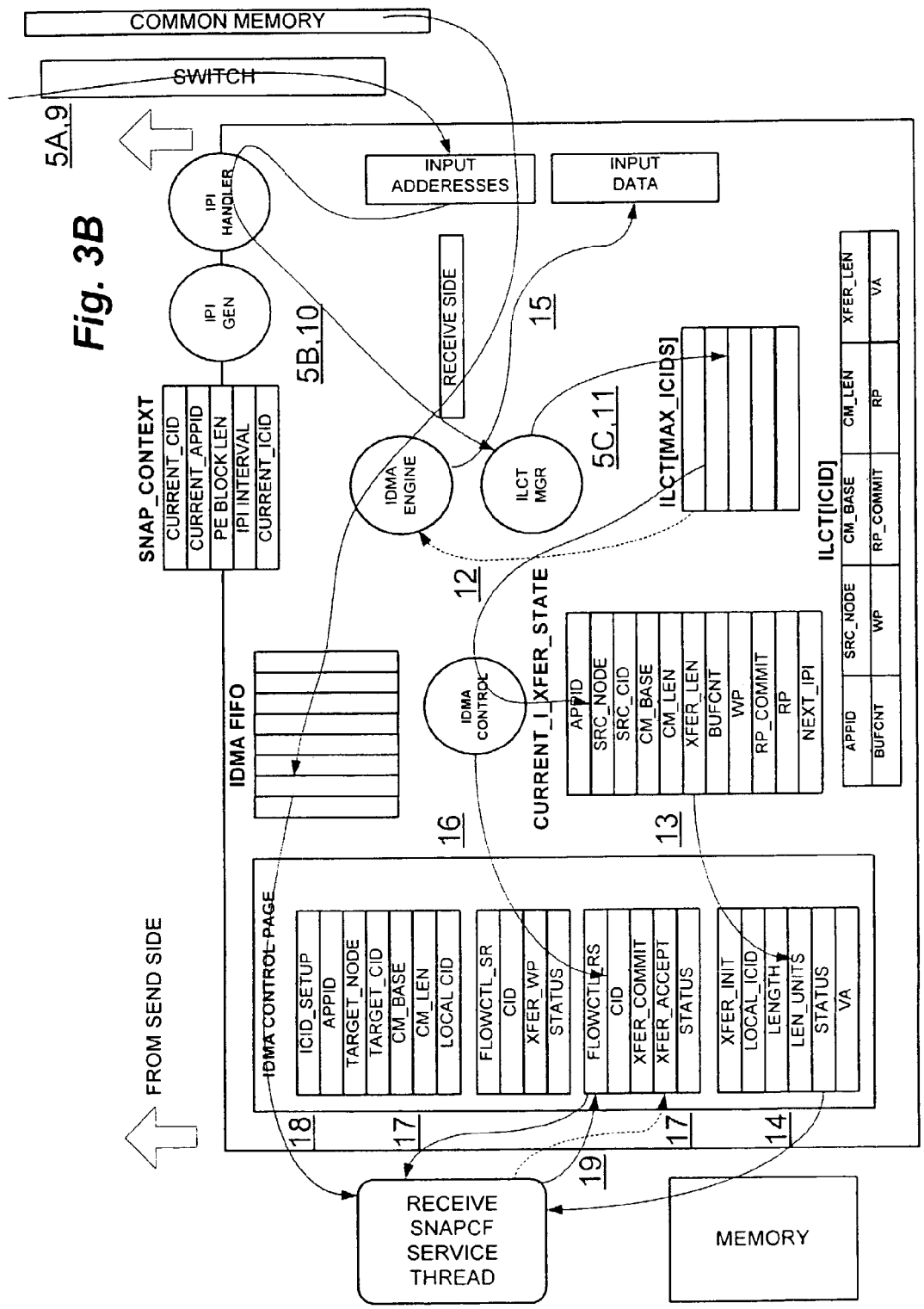

With reference additionally now to FIGS. 3A and 3B, the send and receive sides 202, 204 of the connection 200 of the preceding two figures are shown for purposes of illustrating a representative end-to-end processing example in accordance with an embodiment of the present invention. Please note that the numbering of the structure and elements in FIGS. 3A and 3B have been omitted for the sake of clarity.

End-To-End Processing Example.

The following illustrates the steps involved in setting up a single transfer. The numbered and underlined steps correspond to the numbered underlined elements illustrated in FIGS. 3A and 3B, unless otherwise indicated:

Step 1 (not shown): Application initialization/Connection Setup as previously described.

Step 2: Send Side Application initiates transfer by writing to CID, length, VA to ODMA control page 206 XFER_INIT registers.

Step 3A: ODMA control logic 216 sinks XFER_INIT register write, and (after checking that connection APPID matches APPID of the controlling process; and Step 3B: writes details of the transfer to the OLCT entry for CID specified in XFER_INIT CID.

Step 4: ODMA control logic 216 makes the CID current by copying it's contents to CURRENT_XFER_STATE, initiates generation of transfer startup IPI, and releases the ODMA engine 218 to drain the ODMA FIFO 214 as soon as IPI has been transmitted and there is data to sink.

Step 5A: The IPI generator 252 transmits startup IPI to the target SNAP; then Step 5B: the IPI handler 254 passes Startup IPI data to the ILCT manager 242, which;

Step 5C: updates ILCT for CID to reflect new transfer details.

Step 6: In parallel with Steps 3, 4, and 5, the application starts writing data into the ODMA FIFO 214 although the connection won't be able to process it until step 4 is complete.

Step 7: When the first line is available, the ODMA engine 218 generates a common memory write request, using the CM_Base+offset in CURRENT_XFER_STATE. The offset is then incremented and next_IPI decremented. This step should be repeated until NEXT_IPI=0, or end of transfer.

Step 8: Performed in parallel with Step 6, IPI Generation logic 252 retrieves the target address for IPI, along with remote CID (from CURRENT_XFER_STATE). The common memory write pointer for IPI is also calculated in advance.

Step 9: When NEXT_IPI=0, the ODMA engine 218 blocks, and the IPI generator 252 sends preformatted FLOWCTL_SR IPI packet to the destination SNAP.

Step 10: The destination side IPI handler 254 forwards IPI data to the ILCT manager 242.

Step 11: The ILCT manager 242 updates ILCT entry for CID specified in the IPI packet to reflect new the common memory write pointer.

Step 12: Thereafter, (immediately if IDMA was idle) IDMA control logic 240 selects the CID for this transfer as current, and copies the ILCT entry to CURRENT_XFER_STATE, and releases the IDMA engine 244 to begin filling the IDMA FIFO 238.

Step 13: The IDMA control logic 240 updates the IDMA control page 230 XFER_INIT registers to reflect details of new transfer.

Step 14: The receive side 204 processor 102, which has been polling the XFER_INIT register in idle loop, reads the transfer startup message, updates it's state, and starts polling for a FLOWCTL_SR message.

Step 15: In parallel with Steps 13 and 14, the IDMA engine 244 starts filling the IDMA FIFO 238 from common memory, updating the common memory read pointer in the current input transfer state as each line is read in.

Step 16: After a configurable number of lines (or the whole transfer if short) have been accumulated in the IDMA FIFO 238, the IDMA control block 240 writes the current CID and RP into the IDMA control page 230 FLOWCTL_SR registers.

Step 17: The listener thread poll response picks up the FLOWCTL_SR message.

Step 18: The listener thread reads the data from the IDMA FIFO 238.

Step 19: When the data has all been read, the listener thread acknowledges receipt of the data and commits the transfer up to the read point by writing it's read pointer into the FLOWCTL_SR RP_COMMIT register. If the transfer is more than one block, the process continues according to the rules described previously.

Step 20 (not shown): The IDMA control block 240 reads the committed read pointer from the FLOWCTL_RS register, updates the ILCT and initiates the FLOWCTL IPI back to the sender.

Step 21 (not shown): The FLOWCTL_RS IPI is picked up by the send side 202 SNAP which updates the CURRENT_XFER_STATE to reflect the new committed read pointer. The DMA engine is now free to overwrite the common memory buffer up to new RP.

Step 22 (not shown): The send side 202 ODMA control block 216 updates the ODMA control page 206 FLOWCTL_RS RP_COMMIT value, which will be picked up on the next processor 102 poll.

While there have been described above the principles of the present invention in conjunction with specific techniques and functional blocks, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. An OS-bypass message transport mechanism to communicate between processor nodes that execute a process on a clustered multiprocessor system, said transport mechanism comprising:

a connection that includes a send side coupled to a source processor node and a receive side coupled to a destination processor node;

a single per-connection memory buffer comprising an output data buffer and a input data buffer coupled respectively to the send side and the receive side of the connection by a respective switch/network adaptor interface; and dynamic common memory read and write pointers associated with the single per-connection memory buffer and each of the send side switch/network adaptor interface and the receive side switch/network adaptor interface wherein the send side and the receive side of the connection are decoupled from each other, and wherein the output data buffer is coupled between the source processor node and the per-connection memory buffer and the input data buffer is coupled between the per-connection memory buffer and the destination processor node, and wherein the per-connection memory buffer is dedicated to the process.

2. The OS-bypass message transport mechanism of claim 1, wherein the per-connection memory buffer comprises a portion of a common memory of the clustered multiprocessor system.

3. The OS-bypass message transport mechanism of claim 1, wherein said send side includes outgoing direct memory access (ODMA) engine that controls the transfer of data from the output data register to the per-connection memory buffer.

4. The OS-bypass message transport mechanism of claim 1, comprising an IPI generator coupled to the send side and the receive side, wherein the IPI generator generates control data shared between the send side and receive side.

5. The OS-bypass message transport mechanism of claim 4, comprising an IPI handler coupled to the send side and the receive side for processing the control data generated by the IPI generator.

6. The OS-bypass message transport mechanism of claim 1, wherein said output data buffer and input data buffer comprise first-in-first-out (FIFO) buffers.

7. The OS-bypass message transport mechanism of claim 1, wherein each said switch/network adaptor interface comprises a switch/network adaptor port (SNAP).

8. The OS-bypass message transport mechanism of claim 1, wherein the send side includes an outgoing local connection table (OLCT) and the receive side includes an incoming local connection table (ILCT), and wherein a connection is established between the send side and the receive side by entries in the OLCT and ILCT.

9. The OS-bypass message transport mechanism of claim 8, wherein the connection is a persistent, unidirectional connection.

10. The OS-bypass message transport mechanism of claim 1, wherein said processor nodes are coupled to a multi-adaptive processor (MAP) element.

11. The OS-bypass message transport mechanism of claim 10, wherein the processor nodes coupled to the MAP element are configured for a dual in-line memory module (DIMM) socket.

12. The OS-bypass message transport mechanism of claim 1, wherein the per-connection memory buffer is statically allocated.

13. A clustered multiprocessor system comprising:

an OS-bypass message transport mechanism to communicate between processor nodes that execute a process on the system, wherein said mechanism includes a connection that includes a send side coupled to a source processor node and a receive side coupled to a destination processor node;

a single per-connection memory buffer comprising an update buffer and an input buffer coupled respectively to the send side and the receive side of the connection by a respective switch/network adaptor interface; and dynamic common memory read and write pointers associated with the single per-connection memory buffer and each of the send side switch/network adaptor interface and the receive side switch/network adaptor interface wherein the send side and the receive side of the connection are decoupled from each other, and wherein the output data buffer is coupled between the source processor node and the per-connection memory buffer and the input data buffer is coupled between the per-connection memory buffer and the destination processor node, and wherein the per-connection memory buffer is dedicated to the process.

14. A method of transferring process data from a source processor node to a destination processor node that bypasses an operating system in a clustered multiprocessor system, said method comprising the steps of:

allocating a single per-connection memory buffer comprising an input buffer and an output buffer accessible by the source processor node and the destination processor node via a respective switch/network adaptor interface;

providing dynamic common memory read and write pointers associated with the single per-connection memory buffer and each of the source processor node switch/network adaptor interface and the destination processor node switch/network adaptor interface wherein the source processor node and the destination processor node of the connection are decoupled from each other;

transferring the process data from the source processor node to the output data buffer on a send side;

transferring the process data from the output data buffer to the input data buffer on a receive side; and processing the process data from the input data buffer using the destination processor node.

15. The method of claim 14, wherein the per-connection memory buffer is statically allocated.

16. The method of claim 14, further comprising the step of restricting the per-connection memory buffer to the process data while transferring the process data from the source processor node to the destination processor node.

17. The method of claim 14, wherein the source processor node and the destination processor node are coupled in a duel in-line memory module (DIMM) format.

18. The method of claim 14, wherein each switch/network adaptor interface includes a switch/network adaptor port.

* * * * *